(12) United States Patent
Wu et al.

(10) Patent No.: US 10,938,101 B2
(45) Date of Patent: Mar. 2, 2021

(54) ELECTRONIC DEVICE

(71) Applicant: PEGATRON CORPORATION, Taipei (TW)

(72) Inventors: Chien-Yi Wu, Taipei (TW); Chao-Hsu Wu, Taipei (TW); Cheng-Hsiung Wu, Taipei (TW); Yi-Ru Yang, Taipei (TW); Ching-Hsiang Ko, Taipei (TW); Shih-Keng Huang, Taipei (TW); Sheng-Chin Hsu, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 0 days.

(21) Appl. No.: 16/595,141

(22) Filed: Oct. 7, 2019

(65) Prior Publication Data
US 2020/0144712 A1    May 7, 2020

(30) Foreign Application Priority Data
Nov. 2, 2018   (TW) ................................ 107139068

(51) Int. Cl.
| H01Q 1/52 | (2006.01) |
| H01Q 1/22 | (2006.01) |
| H01Q 5/30 | (2015.01) |
| H01Q 1/24 | (2006.01) |
| H04M 1/03 | (2006.01) |

(52) U.S. Cl.
CPC .......... *H01Q 1/521* (2013.01); *H01Q 1/2291* (2013.01); *H01Q 1/243* (2013.01); *H01Q 1/526* (2013.01); *H01Q 5/30* (2015.01); *H04M 1/03* (2013.01)

(58) Field of Classification Search
CPC .. H01Q 1/52; H01Q 5/30; H01Q 1/22; H01Q 1/24
USPC ........................................................ 343/841
See application file for complete search history.

(56) References Cited

U.S. PATENT DOCUMENTS

2016/0181701 A1*  6/2016  Sangaran ............... H01Q 5/371
                                                                343/837

FOREIGN PATENT DOCUMENTS

| CN | 102751573 | 10/2012 |
| CN | 204616107 | 9/2015 |
| CN | 106711582 | 5/2017 |
| CN | 106935964 | 7/2017 |
| TW | 201806245 | 2/2018 |

* cited by examiner

*Primary Examiner* — Andrea Lindgren Baltzell
(74) *Attorney, Agent, or Firm* — J.C. Patents (57) ABSTRACT

The disclosure provides an electronic device including a carrier, a first antenna, a second antenna, a third antenna, and a shielding structure. The carrier includes a first side and a second side opposite to each other, and a third side and a fourth side opposite to each other. The first antenna is disposed at the first side of the carrier. The second antenna and the third antenna are disposed at the second side of the carrier. The first, second, and third antennas are used for transmitting and receiving wireless signals at first, second, and third frequency bands, respectively. The shielding structure is disposed between the first antenna and the second antenna, and between the first antenna and the third antenna, so that the shielding structure shields interference signals between the first antenna and the second antenna, and interference signals between the first antenna and the third antenna.

13 Claims, 8 Drawing Sheets

ELECTRONIC DEVICE

CROSS-REFERENCE TO RELATED APPLICATION

This application claims the priority benefit of Taiwan application serial no. 107139068, filed on Nov. 2, 2018. The entirety of the above-mentioned patent application is hereby incorporated by reference herein and made a part of this specification.

BACKGROUND

Technology Field

The disclosure relates to an electronic device, and more particularly to an electronic device having three antennas operable in three frequency bands.

Description of Related Art

Wireless communication devices (such as satellite positioning tracker, global positioning system (GPS) tracker) are widely used. In the early days, only GPS antennas were required, but with the development the use of Bluetooth (BT) antennas and long-term evolution (LTE) antennas has become necessary. Since such wireless communication devices need to meet the characteristics of small-size for users to wear, the design difficulty is bound to highly increase when multiple antennas are to be placed in such devices. How to balance between the isolation and performance of three antennas is the goal of research in the field.

SUMMARY

The disclosure provides an electronic device having three antennas with good antenna isolation and antenna efficiency.

The electronic device of the disclosure includes a carrier, a first antenna, a second antenna, a third antenna, and a shielding structure. The carrier includes a first side, a second side, a third side, and a fourth side. The first side and the second side are configured opposite to each other, and the third side and the fourth side are configured opposite to each other. The first antenna is disposed at the first side of the carrier and is located between the third side and the fourth side. The first antenna is used for transmitting and receiving wireless signals of a first frequency band. The second antenna is disposed at the second side of the carrier and is located between the third side and the fourth side. The second antenna is used for transmitting and receiving wireless signals of a second frequency band. The third antenna is disposed at the second side of the carrier and is located between the third side and the fourth side. The third antenna is used for transmitting and receiving wireless signals of a third frequency band. The third frequency band and the second frequency band do not overlap. The shielding structure is disposed between the first antenna and the second antenna, and between the first antenna and the third antenna, so that the shielding structure shields interference signals between the first antenna and the second antenna, and interference signals between the first antenna and the third antenna.

In an embodiment of the disclosure, the shielding structure further includes a cell, a first metal shielding box, and a second metal shielding box. The cell, the first metal shielding box, a circuit board, and the second metal shielding box are sequentially stacked in the thickness direction.

In an embodiment of the disclosure, the thickness of the shielding structure is greater than or equal to the width of the region occupied by the first antenna on the first side. The thickness of the shielding structure is greater than or equal to the width of the region occupied by the second antenna and the third antenna on the second side.

In an embodiment of the disclosure, the length of the shielding structure is greater than or equal to the length of the region occupied by the first antenna on the first side. The length of the shielding structure is greater than or equal to the length of the region occupied by the second antenna and the third antenna on the second side.

In an embodiment of the disclosure, the shielding structure includes a circuit board, and a connection port and a speaker disposed on the circuit board, wherein the connection port is near the third side and the speaker is near the fourth side.

In an embodiment of the disclosure, the circuit board includes a first clearance zone near the first side, a second clearance zone near the second side, a first connection pad located at the first clearance zone, a second connection pad and a third connection pad located at the second clearance zone, a first antenna chip electrically connected to the first connection pad, a second antenna chip electrically connected to the second connection pad, and a third antenna chip electrically connected to the third connection pad. The first antenna, the second antenna, and the third antenna are connected to the first connection pad, the second connection pad, and the third connection pad, respectively, through multiple conductors to be electrically connected to the first antenna chip, the second antenna chip, and the third antenna chip.

In an embodiment of the disclosure, the width of the first clearance zone is between 2 mm and 4 mm. The width of the second clearance zone is between 2 mm and 4 mm.

In an embodiment of the disclosure, the second antenna is closer to the speaker than the third antenna.

In an embodiment of the disclosure, the second antenna is further away from the speaker than the third antenna.

In an embodiment of the disclosure, the electronic device further includes a first flexible circuit board and a second flexible circuit board. The first flexible circuit board is curvedly disposed at the first side of the carrier and the first antenna is disposed on the first flexible circuit board. The second flexible circuit board is curvedly disposed at the second side of the carrier, and the second antenna and the third antenna are disposed on the second flexible circuit board.

In an embodiment of the disclosure, the first frequency band is a long-term evolution (LTE) frequency band, the second frequency band is a global positioning system (GPS) frequency band, and the third frequency band is a Bluetooth (BT) frequency band.

In an embodiment of the disclosure, the electronic device is a small-sized electronic device having a length of 50 mm-60 mm, a width of 20 mm-30 mm, and a thickness of 9 mm-14 mm.

In an embodiment of the disclosure, the first antenna has a length of 46 mm-56 mm, and a width of 8 mm-13 mm. The second antenna and the third antenna have a joint length of 35 mm-50 mm, and a width of 7.5 mm-11 mm.

Based on the above, the electronic device of the disclosure allows the shielding structure to be able to shield interference signals between the first antenna and the second antenna, and interference signals between the first antenna and the third antenna via disposing the first antenna at the first side of the carrier and located between the third side and the fourth side, disposing the second antenna and the third antenna at the second side of the carrier and between the third side and the fourth side, and disposing the shielding structure between the first antenna and the second antenna, and between the first antenna and the third antenna, so that the three antennas have good isolation and good antenna efficiency.

To make the aforementioned and other features of the disclosure more comprehensible, several embodiments accompanied with drawings are described in detail as follows.

DETAILED DESCRIPTION OF DISCLOSED EMBODIMENTS

Figure 1:
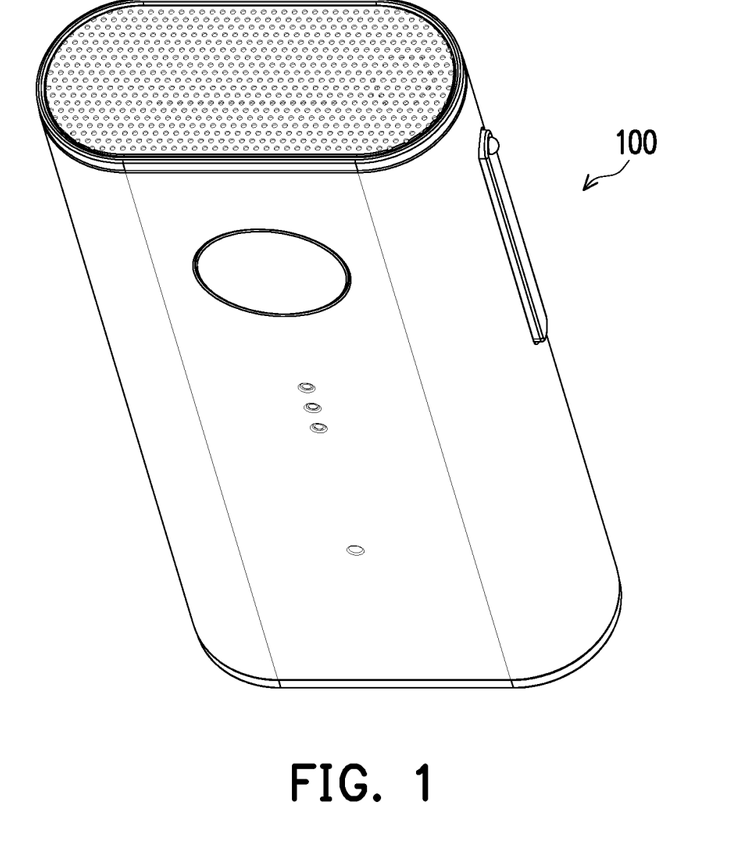
FIG. 1 is a schematic diagram of an electronic device according to an embodiment of the disclosure.
Figure 2:
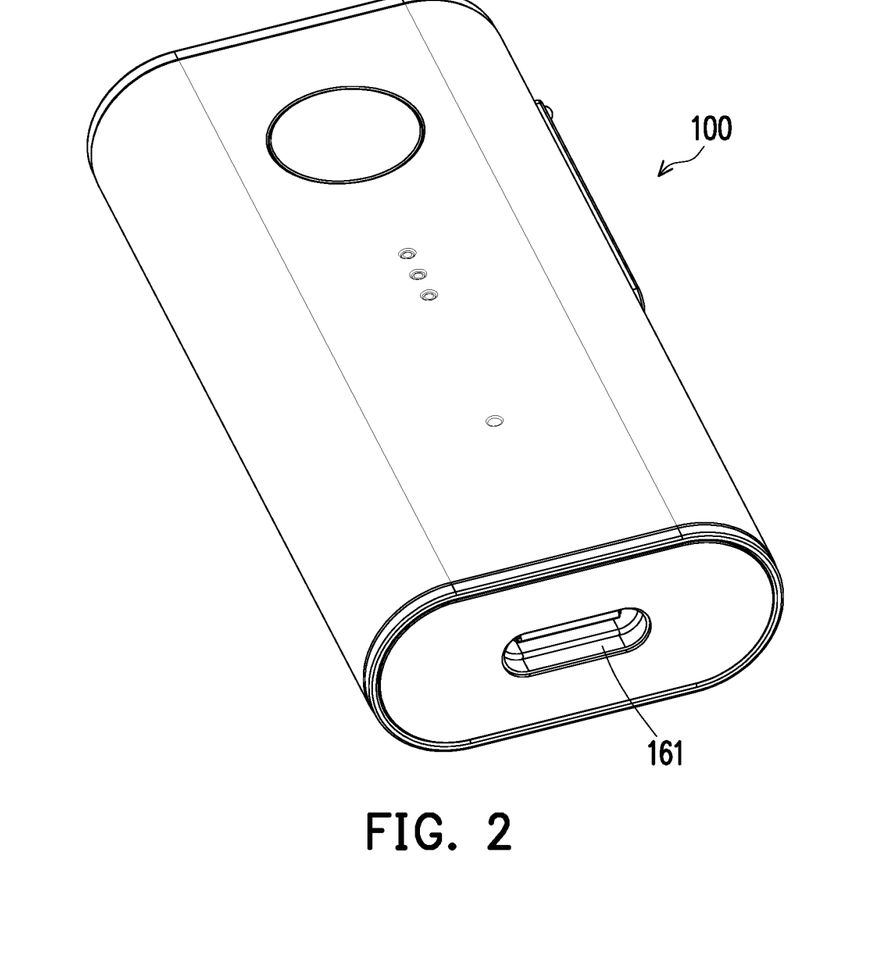
FIG. 2 is a schematic diagram of the electronic device of FIG. 1 in another perspective of view.

FIG. 1 is a schematic diagram of an electronic device according to an embodiment of the disclosure. FIG. 2 is a schematic view of the electronic device of FIG. 1 in another perspective of view. Referring to FIG. 1 and FIG. 2, in the embodiment, an electronic device 100, such as a small-sized satellite positioning tracker, has a length of 50 mm-60 mm, a width of 20 mm-30 mm, and a thickness of 9 mm-14 mm. For example, the length is 55 mm, the width is 25 mm, and the thickness is 11.4 mm. Of course, the type and size of the electronic device 100 are not limited thereto. The electronic device 100 of the embodiment is disposed with three antennas, operable in three frequency bands in a limited space, with good antenna isolation and antenna efficiency, which will be illustrated below.

Figure 3:
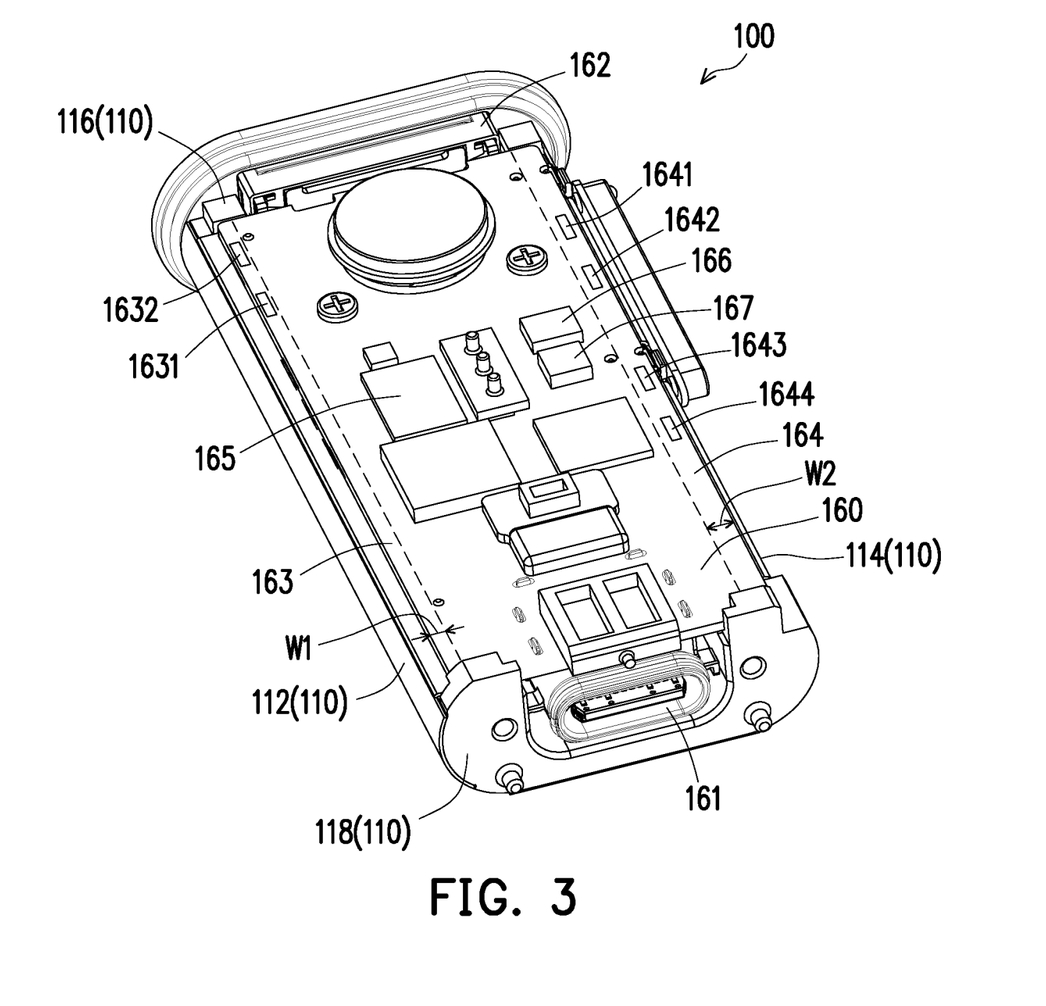
FIG. 3 is a schematic diagram of the electronic device of FIG. 1 with hidden outer casing, partial carrier, first antenna, second antenna, and third antenna.
Figure 4:
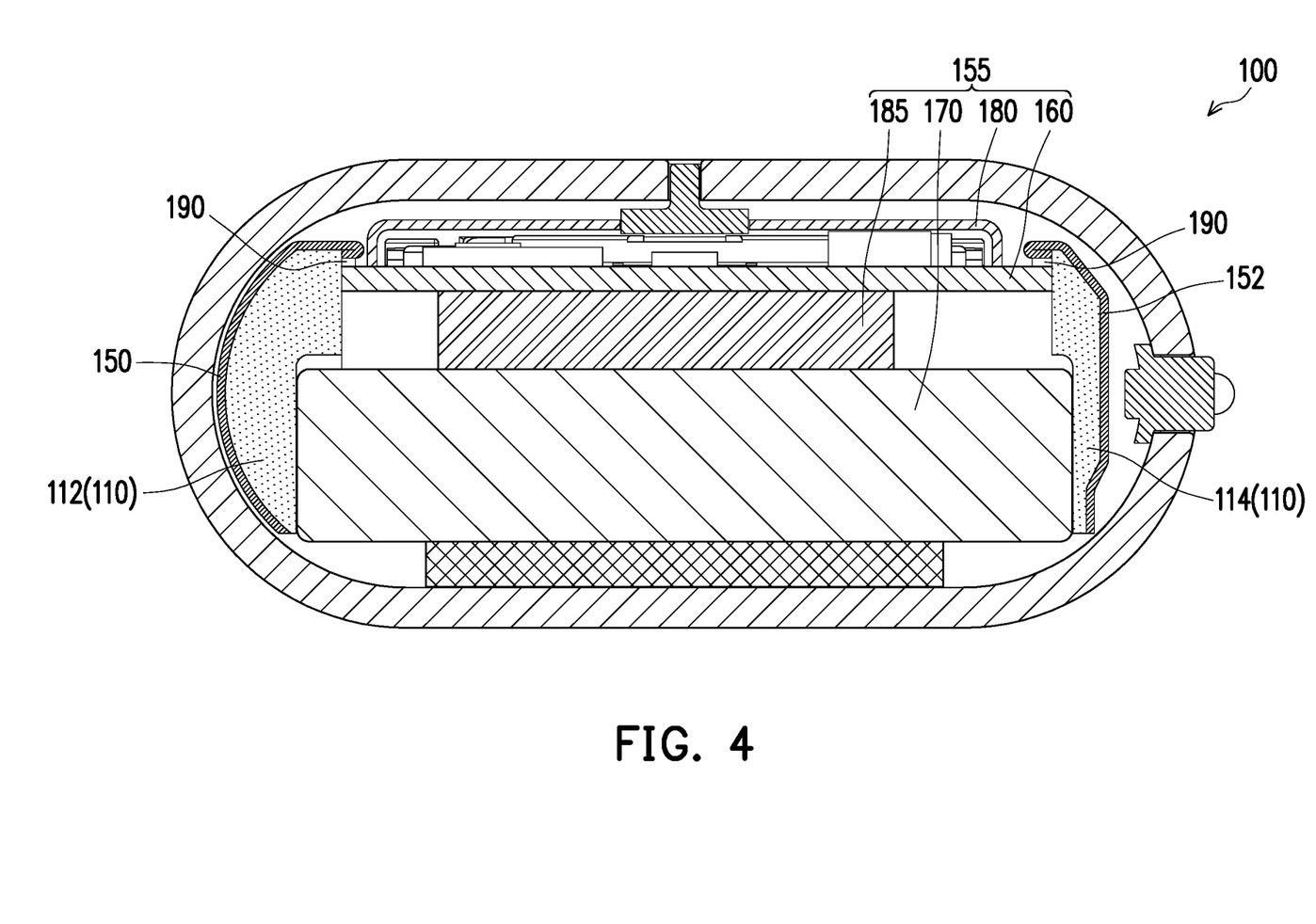
FIG. 4 is a cross-sectional diagram of the electronic device of FIG. 1.
Figure 5:
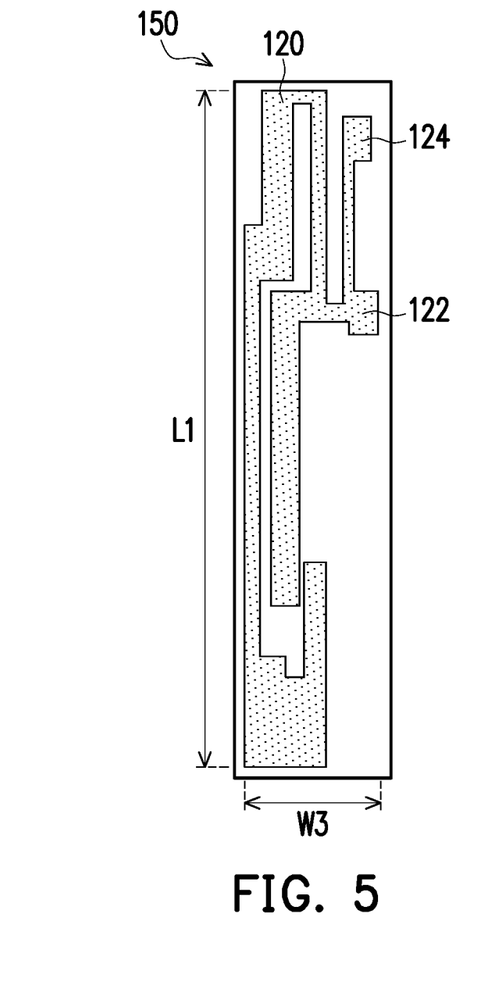
FIG. 5 is a schematic diagram of the first antenna of the electronic device of FIG. 1.
Figure 6:
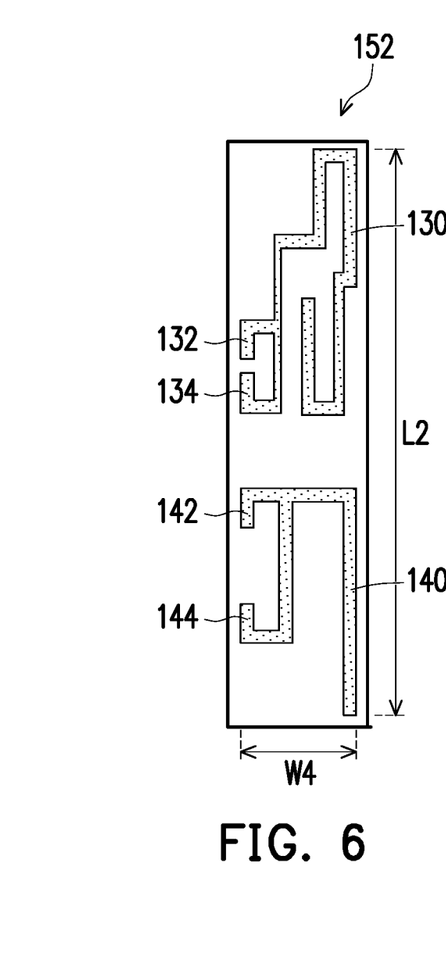
FIG. 6 is a schematic diagram of the second antenna and the third antenna of the electronic device of FIG. 1.

FIG. 3 is a schematic diagram of the electronic device of FIG. 1 with hidden outer casing, partial carrier, first antenna, second antenna, and third antenna. FIG. 4 is a cross-sectional diagram of the electronic device of FIG. 1. FIG. 5 is a schematic diagram of the first antenna of the electronic device of FIG. 1. FIG. 6 is a schematic diagram of the second antenna and the third antenna of the electronic device of FIG. 1.

Referring to FIG. 3 to FIG. 6 simultaneously, the electronic device 100 of the embodiment includes a carrier 110 (FIG. 4), a first antenna 120 (FIG. 5), a second antenna 130 (FIG. 6), a third antenna 140 (FIG. 6), and a shielding structure 155 (FIG. 4). The first antenna 120 is used for transmitting and receiving wireless signals at a first frequency band, the second antenna 130 is used for transmitting and receiving wireless signals at a second frequency band, and the third antenna 140 is used for transmitting and receiving wireless signals at a third frequency band. In the embodiment, the first frequency band is a long-term evolution (LTE) frequency band, the second frequency band is a global positioning system (GPS) frequency band, and the third frequency band is a Bluetooth (BT) frequency band. The first frequency band includes a low frequency band and a high frequency band. The low frequency band of the first frequency band is between 791 MHz and 894 MHz, and the high frequency band of the first frequency band is between 1710 MHz and 2170 MHz. The second frequency band is between 1575 MHz and 1615 MHz, and the third frequency band is between 2400 MHz and 2500 MHz. Of course, the first frequency band, the second frequency band, and the third frequency band are not limited thereto.

As can be seen from FIG. 3, the carrier 110 includes a first side 112 (left side of FIG. 3) and a second side 114 (right side of FIG. 3) opposite to each other, and a third side 116 (upper side of FIG. 3) and a fourth side 118 (lower side of FIG. 3) opposite to each other. In the embodiment, the carrier 110 is, for example, a plastic member used for positioning the shielding structure 155 (FIG. 4), the first antenna 120 (FIG. 5), the second antenna 130 (FIG. 6), and the third antenna 140 (FIG. 6), but the material and use of the carrier 110 are not limited thereto.

As can be seen from FIG. 4, in the embodiment, the electronic device 100 further optionally includes a first flexible circuit board 150 and a second flexible circuit board 152. The first flexible circuit board 150 is curvedly disposed at the first side 112 of the carrier 110. The second flexible circuit board 152 is curvedly disposed at the second side 114 of the carrier 110. As seen in FIG. 5, the first antenna 120 is disposed on the first flexible circuit board 150. As can be seen from FIG. 6, the second antenna 130 and the third antenna 140 are jointly disposed on the second flexible circuit board 152.

In other words, in the embodiment, the first antenna 120 is disposed at the first side 112 of the carrier 110 via the first flexible circuit board 150 and the first antenna 120 is located between the third side 116 and the fourth side 118 of the carrier 110. The second antenna 130 and the third antenna 140 are disposed at the second side 114 of the carrier 110 via the second flexible circuit board 152, and the second antenna 130 and the third antenna 140 are located between the third side 116 and the fourth side 118 of the carrier 110. Of course, in other embodiments, the first flexible circuit board 150 or/and the second flexible circuit board 152 may also be omitted, and the first antenna 120, the second antenna 130, or/and the third antenna 140 may be directly disposed on the carrier 110.

As shown in FIG. 4, in the embodiment, the shielding structure 155 is disposed between the first flexible circuit board 150 and the second flexible circuit board 152, such that the shielding structure 155 is disposed between the first antenna 120 and the second antenna 130, and between the first antenna 120 and the third antenna 140. Returning to FIG. 3, in the embodiment, the shielding structure 155 may optionally include a circuit board 160, and a connection port 161 and a speaker 162 disposed on the circuit board 160, wherein the connection port 161 is near the fourth side 118 and the speaker 162 is near the third side 116.

In the embodiment, the connection port 161 and the speaker 162 are disposed at positions near the fourth side 118 and the third side 116, respectively, such that the length of the shielding structure 155 is greater than or equal to the length of the first side 112 and the length of the second side 114 of the carrier 110. In this way, the length of the shielding structure 155 may be greater than or equal to the length of the region occupied by the first antenna 120 on the first side 112 and the length of the shielding structure 155 is greater than or equal to the length of the region occupied by the second antenna 130 and the third antenna 140 on the second side 114. Therefore, the shielding structure 155 may effectively shield interference signals between the first antenna 120 and the second antenna 130, and shield interference signals between the first antenna 120 and the third antenna 140.

In other words, in the electronic device 100 of the embodiment, some objects originally disposed inside the casing (for example, the circuit board 160, the connection port 161, and the speaker 162) are disposed between the first antenna 120 and the second antenna 130, and between the first antenna 120 and the third antenna 140 by as the shielding structure 155, so that better isolation performance between the multiple antennas is achieved. Of course, the type of the shielding structure 155 is not limited thereto.

As seen in FIG. 4, the shielding structure 155 may also optionally include a cell 170, a first metal shielding box 180, and a second metal shielding box 185. The cell 170, one of the metal shielding boxes (e.g. the second metal shielding box 185), the circuit board 160, and another of the metal shielding boxes (e.g. the first metal shielding box 180) are sequentially stacked in the thickness direction. Therefore, the thickness of the shielding structure 155 is greater than or equal to the width of the region occupied by the first antenna 120 on the first side 112, and the thickness of the shielding structure 155 is greater than or equal to the width of the region occupied by the second antenna 130 and the third antenna 140 on the second side 114. As such, the shielding structure 155 may better shield interference signals between the first antenna 120 and the second antenna 130, and interference signals between the first antenna 120 and the third antenna 140.

As shown in FIG. 3, the circuit board 160 includes a first clearance zone 163 near the first side 112 (left side of FIG. 3), a second clearance zone 164 near the second side 114 (right side of FIG. 3), first connection pads 1631 and 1632 located at the first clearance zone 163, second connection pads 1641 and 1642 and third connection pads 1643 and 1644 located at the second clearance zone 164, a first antenna chip 165 electrically connected to the first connection pad 1631, a second antenna chip 166 electrically connected to the second connection pad 1641, and a third antenna chip 167 electrically connected to the third connection pad 1643.

As can be seen from FIG. 5 and FIG. 6, the first antenna 120, the second antenna 130, and the third antenna 140 have multiple feed ends 122, 132, and 142 and ground ends 124, 134, and 144. The feed ends 122, 132, and 142 of the first antenna 120, the second antenna 130, and the third antenna 140 are connected to the first connection pad 1631, the second connection pad 1641, and the third connection pad 1643, respectively, shown in FIG. 3 through conductors 190 (FIG. 4) to be electrically connected to the first antenna chip 165, the second antenna chip 166, and the third antenna chip 167. The ground ends 124, 134, and 144 of the first antenna 120, the second antenna 130, and the third antenna 140 may also be connected to the first connection pad 1632, the second connection pad 1642, and the third connection pad 1644 through the conductors 190 (FIG. 4) to be electrically connected to a ground plane (not shown) on the circuit board 160.

In the embodiment, each of the conductors 190 is, for example, a conductive tape. In other embodiments, the conductor 190 may also be a wire or a solder, and the type of the conductor 190 is not limited thereto. In the embodiment, conduction through the conductor 190 such as the conductive tape may replace the conventional shrapnel or connector to reduce the area and space occupied by the circuit board 160.

In the embodiment, the first antenna 120 (FIG. 5) could partially cover the first clearance zone 163 (FIG. 3), and the second antenna 130 (FIG. 6) and the third antenna 140 (FIG. 6) could partially cover the second clearance zone 164 (FIG. 3). As shown in FIG. 3, in the embodiment, a width W1 of the first clearance zone 163 is between 2 mm and 4 mm, and a width W2 of the second clearance zone 164 is between 2 mm and 4 mm. Certainly, the widths W1 and W2 of the first clearance zone 163 and the second clearance zone 164 are not limited thereto.

Further, as shown in FIG. 5, in the embodiment, the first antenna 120 has a length L1 between 46 mm and 56 mm, and a width W3 between 8 mm and 13 mm. For example, the first antenna 120 has the length L of 51 mm and the width W3 of 11 mm. Certainly, the length L1 and the width W3 of the first antenna 120 are not limited thereto.

As shown in FIG. 6, in the embodiment, the second antenna 130 and the third antenna 140 have a joint length L2 between 35 mm and 50 mm, and a joint width W4 between 7.5 mm and 11 mm. For example, the second antenna 130 and the third antenna 140 have the joint length L2 of 45 mm and the joint width W4 of 9.5 mm. Certainly, the joint length L2 and joint the width W4 of the second antenna 130 and the third antenna 140 are not limited thereto.

In the embodiment, the second antenna 130 is disposed above the third antenna 140 as shown in FIG. 6, such that the second antenna 130 is closer to the speaker 162 than the third antenna 140 (FIG. 3). However, the configuration of the second antenna 130 and the third antenna 140 is not limited thereto.

Figure 7:
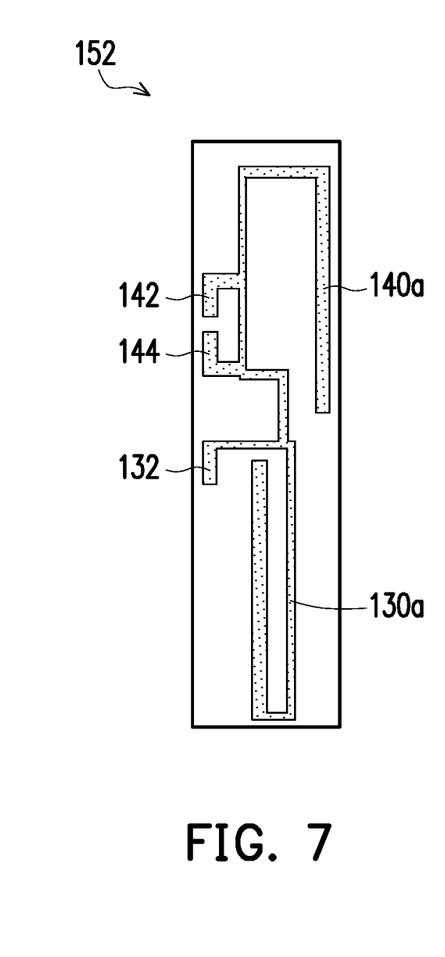
FIG. 7 is a schematic diagram of a layout of a second antenna and a third antenna of an electronic device according to another embodiment of the disclosure.

FIG. 7 is a schematic diagram of a layout of a second antenna and a third antenna of an electronic device according to another embodiment of the disclosure. Referring to FIG. 7, in the embodiment, a second antenna 130*a* is disposed at a bottom position of a third antenna 140*a*, such that the second antenna 130*a* is further away from the speaker 162 (FIG. 3) than the third antenna 140*a*. In the embodiment, the second antenna 130*a* and the third antenna 140*a* may share a ground end (for example, the ground end 144 is kept, and the junction between the second antenna 130*a* and the third antenna 140*a* may be used as a shared spot for antennas), so that only one connection pad (for example, the third connection pad 1644) to be connected to the ground end 144 needs to be disposed on the second clearance zone 164.

Through verification tests of the embodiments, if the second antenna 130 is disposed closer to the speaker 162 than the third antenna 140 as shown in FIG. 6, the antenna efficiency of the second antenna 130 is approximately between −5.1 dBi and −5.3 dBi, and the antenna efficiency of the third antenna 140 is approximately between −2.2 dBi and −2.9 dBi. If the second antenna 130*a* is disposed further away from the speaker 162 than the third antenna 140*a* as shown in FIG. 7, the antenna efficiency of the second antenna 130*a* is approximately between −3.1 dBi and −4.0 dBi, and the antenna efficiency of the third antenna 140a is approximately between −5.5 dBi and −6.0 dBi. Therefore, all of the second antennas 130 and 130a, and the third antennas 140 and 140a can have good antenna efficiency whether the second antenna 130 is disposed at a position closer to the speaker 162 or the second antenna 130a is disposed at a position further away from the speaker 162.

Figure 8:
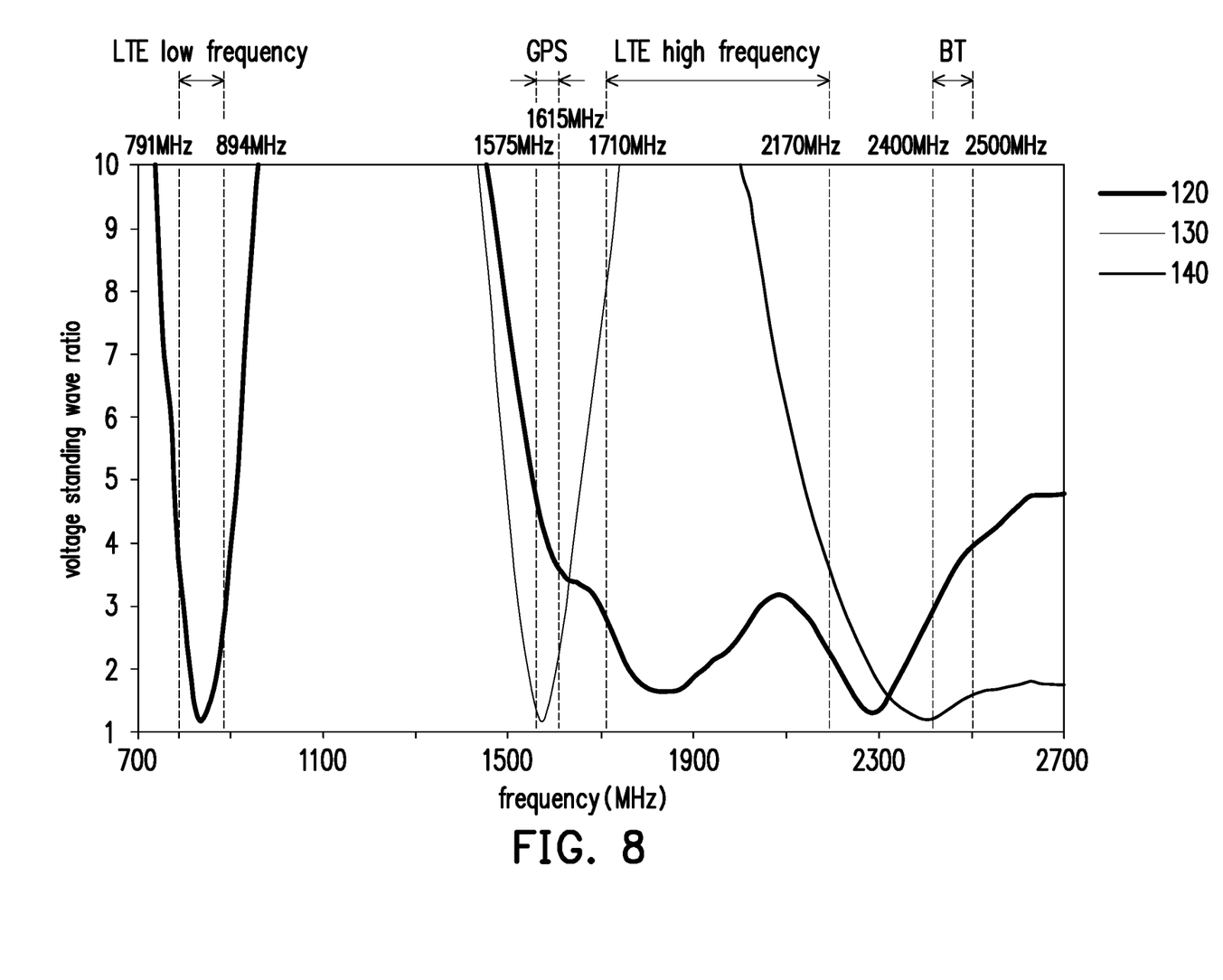
FIG. 8 is a plot of frequency-voltage standing wave ratios of the first antenna, the second antenna, and the third antenna of the electronic device of FIG. 1.

FIG. 8 is a plot of frequency-voltage standing wave ratios of the first antenna, the second antenna, and the third antenna of the electronic device of FIG. 1. Referring to FIG. 8, in the embodiment, the voltage standing wave ratios in the low frequency band (791 MHz to 894 MHz) of the first antenna 120, the high frequency band (1710 MHz to 2170 MHz) of the first antenna 120, the frequency band of the second antenna 130 (1575 MHz to 1615 MHz), and the frequency band of the third antenna 140 (2400 MHz to 2500 MHz) are lower than 3. Therefore, the voltage standing wave ratios of the first antenna 120, the second antenna 130, and the third antenna 140 have good performance.

Figure 9:
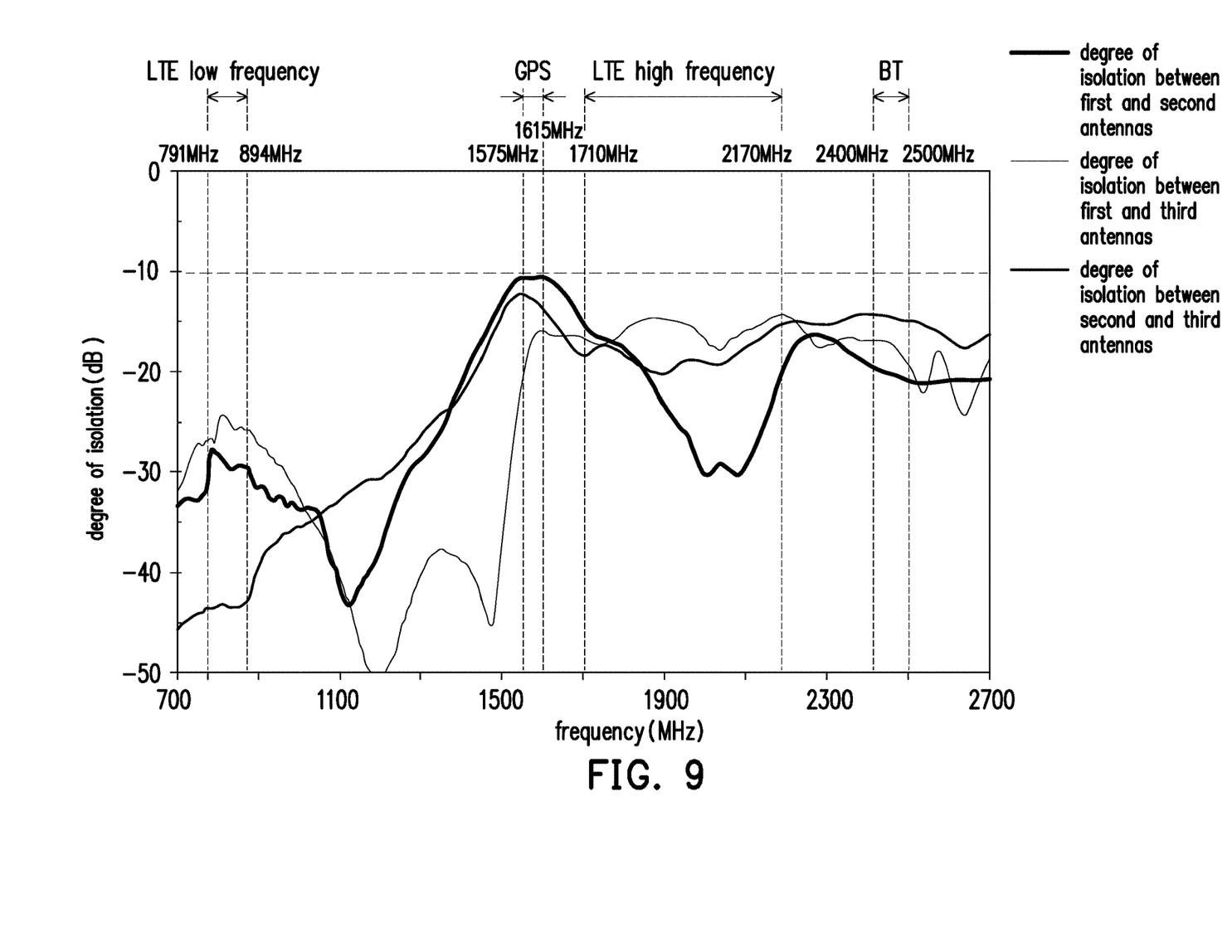
FIG. 9 is a plot of frequency vs. isolation between one another among the first antenna, the second antenna, and the third antenna of the electronic device of FIG. 1.

FIG. 9 is a plot of frequency vs. isolation between one another among the first antenna, the second antenna, and the third antenna of the electronic device of FIG. 1. Referring to FIG. 9, in the embodiment, the bold line represents the isolation between the first antenna 120 and the second antenna 130, and the finest line represents the isolation between the first antenna 120 and the third antenna 140, and the line with medium width represents the isolation between the second antenna 130 and the third antenna 140. As can be seen from FIG. 9, the isolation between one another among the low frequency band (791 MHz to 894 MHz) of the first antenna 120, the high frequency band (1710 MHz to 2170 MHz) of the first antenna 120, the frequency band (1575 MHz to 1615 MHz) of the second antenna 130, and the frequency band (2400 MHz to each other in 2500 MHz) of the third antenna 140 is all lower than −10 dB. Therefore, the isolation between one another among the first antenna 120, the second antenna 130, and the third antenna 140 has good performance.

Figure 10:
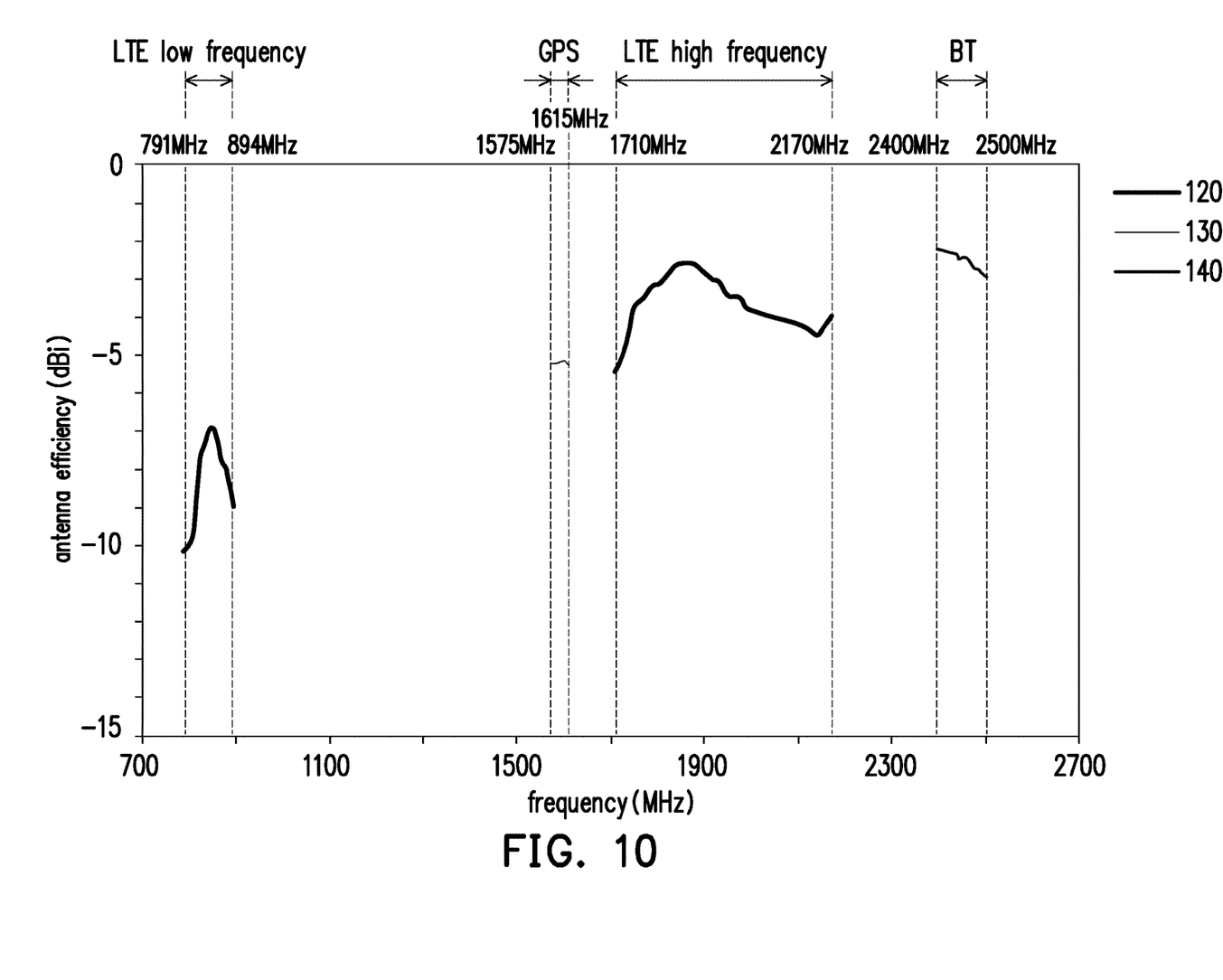
FIG. 10 is a plot of frequency vs. antenna efficiency of the first antenna, the second antenna, and the third antenna of the electronic device of FIG. 1.

FIG. 10 is a plot of frequency vs. antenna efficiency of the first antenna, the second antenna, and the third antenna of the electronic device of FIG. 1. Referring to FIG. 10, if the length of the ground plane of the circuit board 160 is 47 mm and the width thereof is 24.3 mm, the antenna efficiency of the low frequency band (791 MHz to 894 MHz) of the first antenna 120 is −6.8 dBi to −10.1 dBi, the antenna efficiency of the high frequency range (1710 MHz to 2170 MHz) of the first antenna 120 is −2.6 dBi to −5.4 dBi, the antenna efficiency of the frequency (1575 MHz to 1615 MHz) of the second antenna 130 is −5.1 dBi to −5.2 dBi, and the antenna efficiency of the frequency (2400 MHz to 2500 MHz)of the third antenna 140 is −2.2 dBi to −2.9 dBi, and thus good performance on antenna efficiency is achieved.

Based on the above, the electronic device of the disclosure allows the shielding structure to be able to shield interference signals between the first antenna and the second antenna, and interference signals between the first antenna and the third antenna by disposing the first antenna at the first side of the carrier and located between the third side and the fourth side, disposing the second antenna and the third antenna at the second side of the carrier and between the third side and the fourth side, and disposing the shielding structure between the first antenna and the second antenna, and between the first antenna and the third antenna with the connection port of the shielding structure near the third side and with the speaker of the shielding structure near the fourth side, so that the three antennas have good isolation and good antenna efficiency.

Although the disclosure has been disclosed in the above embodiments, the embodiments are not intended to limit the disclosure. It will be apparent to persons skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An electronic device, comprising:
    a carrier, comprising a first side, a second side, a third side, and a fourth side, wherein the first side and the second side are opposite to each other, and the third side and the fourth side are opposite to each other;
    a first antenna, disposed at the first side of the carrier and located between the third side and the fourth side, used for transmitting and receiving wireless signals at a first frequency band;
    a second antenna, disposed at the second side of the carrier and located between the third side and the fourth side, used for transmitting and receiving wireless signals at a second frequency band;
    a third antenna, disposed at the second side of the carrier and located between the third side and the fourth side, used for transmitting and receiving wireless signals at a third frequency band, wherein the third frequency band and the second frequency band do not overlap; and
    a shielding structure, disposed between the first antenna and the second antenna and between the first antenna and the third antenna, used for shielding interference signals between the first antenna and the second antenna and interference signals between the first antenna and the third antenna.

2. The electronic device according to claim 1, wherein the shielding structure further comprises a cell, a first metal shielding box, and a second metal shielding box, wherein the cell, the first metal shielding box, and the second metal shielding box are sequentially stacked in a thickness direction.

3. The electronic device according to claim 1, wherein a thickness of the shielding structure is greater than or equal to a width of a region occupied by the first antenna on the first side and the thickness of the shielding structure is greater than or equal to a width of a region occupied by the second antenna and the third antenna on the second side.

4. The electronic device according to claim 1, wherein a length of the shielding structure is greater than or equal to a length of the region occupied by the first antenna on the first side and the length of the shielding structure is greater than or equal to a length of the region occupied by the second antenna and the third antenna on the second side.

5. The electronic device according to claim 1, wherein the shielding structure comprises a circuit board, and a connection port and a speaker disposed on the circuit board, wherein the connection port is near the third side and the speaker is near the fourth side.

6. The electronic device according to claim 5, wherein the circuit board comprises a first clearance zone near the first side, a second clearance zone near the second side, a first connection pad located at the first clearance zone, a second connection pad and a third connection pad located at the second clearance zone, a first antenna chip electrically connected to the first connection pad, a second antenna chip electrically connected to the second connection pad, and a third antenna chip electrically connected to the third connection pad, wherein the first antenna, the second antenna, and the third antenna are connected to the first connection pad, the second connection pad, and the third connection pad, respectively, through a plurality of conductors to be electrically connected to the first antenna chip, the second antenna chip, and the third antenna chip.

7. The electronic device according to claim 6, wherein a width of the first clearance zone is between 2 mm and 4 mm, and a width of the second clearance zone is between 2 mm and 4 mm.

8. The electronic device according to claim 5, wherein the second antenna is closer to the speaker than the third antenna.

9. The electronic device according to claim 5, wherein the second antenna is further away from the speaker than the third antenna.

10. The electronic device according to claim 1, further comprising:
    a first flexible circuit board, curvedly disposed on the first side of the carrier, wherein the first antenna is disposed on the first flexible circuit board; and
    a second flexible circuit board, curvedly disposed on the second side of the carrier, wherein the second antenna and the third antenna are disposed on the second flexible circuit board.

11. The electronic device according to claim 1, wherein the first frequency band is a long-term evolution (LTE) frequency band, the second frequency band is a global positioning system (GPS) frequency band, and the third frequency band is a Bluetooth (BT) frequency band.

12. The electronic device according to claim 1, wherein the electronic device is a small-sized electronic device with a length between 50 mm and 60 mm, a width between 20 mm and 30 mm, and a thickness between 9 mm and 14 mm.

13. The electronic device according to claim 1, wherein the first antenna has a length between 46 mm and 56 mm, and a width between 8 mm and 13 mm, and the second antenna and the third antenna have a joint length between 35 mm and 50 mm, and a joint width between 7.5 mm and 11 mm.

* * * * *